United States Patent [19]

Herring et al.

[11] Patent Number: 4,969,114

[45] Date of Patent: Nov. 6, 1990

[54] METHOD FOR DETERMINING AN INTUITIVELY DEFINED SPATIAL RELATIONSHIP AMONG PHYSICAL ENTITIES

[75] Inventors: John R. Herring, Decatur; Dianne L. Oliver; Gary W. Cooke, both of Huntsville, all of Ala.

[73] Assignee: Intergraph Corporation, Huntsville, Ala.

[21] Appl. No.: 270,255

[22] Filed: Nov. 14, 1988

[51] Int. Cl.[5] .............................................. G06F 7/04
[52] U.S. Cl. .................................................. 364/570
[58] Field of Search .................. 364/570, 420; 382/26, 382/25, 23

[56] References Cited

PUBLICATIONS

"Spatial Management of Data", Christopher F. Herot, ACM Trans. on Database Systems, vol. 5, No. 4, 12/80, pp. 493–574.
Pullar et al: Toward Formal Definitions of Topological Relations Among Spatial Objects, Report 93.
Spatial Analyst (SPAN) User's Guide, DMAP16630, Oct. 13, 1988, Intergraph.
Herring: TIGRIS: Topologically Integrated Geographic Information System, Proceedings of Eighth International Symposium on Computer-Assisted Cartography.
Herring et al.: Extensions to the SQL Query Language to Support Spatial Analysis in a Topological Data Base, Proceedings of GIS/LIS '88.
Egenhofer: Topological Relationships in Spatial Databases, National Center for Geographic Information and Analysis and Department of Surveying Engineering, University of Maine.

Primary Examiner—Gary Chin
Assistant Examiner—S. A. Melnick
Attorney, Agent, or Firm—Cushman, Darby & Cushman

[57] ABSTRACT

Apparatus and method for determining whether a specific spatial relationship exists among physical spatial entities. First, spatially significant descriptors such as the interior and boundary of the physical spatial entities are selected and sets of elements forming a representation of each of the descriptors for each spatial entity is determined. Intersections are then determined between the sets of elements for every combination of descriptors and these intersections are categorized. The categorized relationships are then combined to determine a unique mathematical relationship between the spatial entities. The specific spatial relationship to be analyzed is broken down into the set of desired mathetmatical relationships. According to the present invention, it is then determined whether the unique mathematical relationship between the spatial entities matches any of the desired mathematical relationships used to define the specific relationship, to determine whether or not the spatial entities have the specific relationship.

50 Claims, 5 Drawing Sheets

|  | dA∩dB | iA∩iB | dA∩iB | iA∩dB |
|---|---|---|---|---|
| INTERSECTION | {6,8} <br> #dA=10 <br> #dB=2 | 0 <br> #iA=3 <br> #iB=3 | {1,2,7} | 0 |
| c | 1 | 0 | 1 | 0 |
| b | 2 | 0 | 2 | 0 |
| p | 3 | 0 | 3 | 0 |

| | dA∩dB | iA∩iB | dA∩iB | iA∩dB |
|---|---|---|---|---|
| INTERSECTION | {7,10}<br># dA=10<br># dB=2 | {13}<br># iA=3<br># iB=1 | 0 | 0 |
| c | 1 | 1 | 0 | 0 |
| b | 2 | 2 | 0 | 0 |
| p | 3 | 3 | 0 | 0 |

| | d(A) ∩ d(B) | | i(A) ∩ i(B) | | d(A) ∩ i(B) | | i(A) ∩ d(B) | |
|---|---|---|---|---|---|---|---|---|
| c 0  | 0 | (disjoint)  | 0 | (disjoint)  | 0 | (disjoint)  | 0 | (disjoint) |
| c 1  | 1 | (intersect) | 0 | (disjoint)  | 0 | (disjoint)  | 0 | (disjoint) |
| c 2  | 0 | (disjoint)  | 1 | (intersect) | 0 | (disjoint)  | 0 | (disjoint) |
| c 3  | 1 | (intersect) | 1 | (intersect) | 0 | (disjoint)  | 0 | (disjoint) |
| c 4  | 0 | (disjoint)  | 0 | (disjoint)  | 1 | (intersect) | 0 | (disjoint) |
| c 5  | 1 | (intersect) | 1 | (intersect) | 1 | (intersect) | 0 | (disjoint) |
| c 6  | 0 | (disjoint)  | 1 | (intersect) | 1 | (intersect) | 0 | (disjoint) |
| c 7  | 1 | (intersect) | 1 | (intersect) | 1 | (intersect) | 0 | (disjoint) |
| c 8  | 0 | (disjoint)  | 0 | (disjoint)  | 0 | (disjoint)  | 1 | (intersect) |
| c 9  | 1 | (intersect) | 1 | (intersect) | 0 | (disjoint)  | 1 | (intersect) |
| c 10 | 0 | (disjoint)  | 0 | (disjoint)  | 1 | (intersect) | 1 | (intersect) |
| c 11 | 1 | (intersect) | 1 | (intersect) | 1 | (intersect) | 1 | (intersect) |
| c 12 | 0 | (disjoint)  | 0 | (disjoint)  | 1 | (intersect) | 1 | (intersect) |
| c 13 | 1 | (intersect) | 1 | (intersect) | 1 | (intersect) | 1 | (intersect) |
| c 14 | 0 | (disjoint)  | 1 | (intersect) | 1 | (intersect) | 1 | (intersect) |
| c 15 | 1 | (intersect) | 1 | (intersect) | 1 | (intersect) | 1 | (intersect) |

METHOD FOR DETERMINING AN INTUITIVELY DEFINED SPATIAL RELATIONSHIP AMONG PHYSICAL ENTITIES

BACKGROUND OF THE INVENTION

1. Field of the Invention

This application relates to apparatus and a method for determining relationships among physical spatial entities. More specifically, this invention relates to a technique for compensating for definitional variations in terms employed to describe spatial relationships among physical spatial entities.

2. Description of Related Art

For many applications such as land use planning and environmental studies, it is necessary to define and determine physical relationships between physical spatial entities such as adjacent land areas. For example, in the context of environmental studies, it may be necessary to determine the number of industrial facilities located adjacent to a particular river. Although at first blush this may seem like a trivial task, a number of problems exist.

Definitions are one source of problems. The terms employed to describe the physical relationships are extremely context sensitive. The term "adjacent" when describing the land areas in which particular animal populations are found is quite different than what is meant when that term is employed to describe the relationship of an industrial site and a river, since animals roam and their boundaries are inherently imprecise. Both uses of the term are quite different than when the term is employed to describe the positioning of transistors in an integrated circuit, since the scale is so much smaller. Even within the same context, definitions can vary. The term "intersection" means something different in the lexicon of British topographers as compared to American topographers.

A second problem exists regarding the collection of information necessary to assess the physical relationships between physical spatial entities. Of course, it is always possible to send out a team to travel to the location of the spatial entities to determine the appropriate relationships. This obviously becomes quite expensive and time consuming, particularly when the spatial entities cover extensive portions of the globe.

In this age of the computer, spatial data bases or geographic information systems have been developed for storing information related to two or three dimensional physical spatial entities. Such systems store vector or raster descriptions of spatial entities including altitudes, alpha-numeric descriptors and the like. They are designed to store and process data for which spatial location is an important component of the information content of the data. The critical concern for the development of a geographic information system is the integration of a wide variety of diverse information with location as the criteria for the relationships.

A problem with such spatial data bases is that there is a great amount of information contained within the data. If land parcels are described in coordinates, it is difficult to tell if the parcels are next to each other. Furthermore, it is usually unclear exactly what is meant by the phrase next to. Suppose one parcel of land is described by corner posts and another parcel is described by lines. It is difficult to compare the physical relationship of these two parcels.

Furthermore, even with geographic information systems, definitions of relational terms is very context sensitive.

In order to determine relationships between physical spatial entities, Intergraph Corporation, of Huntsville, Ala., developed its Spatial Analyst TM system. This system breaks down spatial information in a data base into its most basic elements consisting of faces, edges and nodes. Nodes are distinguished points. Edges are nonintersecting curves between nodes. Faces are connected areas not on edges or nodes. Thus, for example, in FIG. 3, the numbered circles represent nodes, the numbered lines represent edges and the numbered areas represent faces. Once information in the data base is defined in terms of these three basic types of elements, certain relationships between two elements can then be determined. According to the Spatial Analyst TM system, twenty-seven specific categories define the possible relationships between a face and either another face, an edge or a node, an edge and either another edge or a node, and two nodes. The particular elements to be analyzed are then compared one at a time with the twenty-seven different possibilities to establish which of those possibilities describes the relationship between the two elements being analyzed.

With this approach, large numbers of computer program steps are necessary to conduct the one-at-a-time type searching among the twenty-seven different possibilities for each intuitive relationship an operator might wish to establish. Intuitive relationships, as the term is used in this patent, are those relationships and comparisons made upon spatial data which are characterized by human intuition. In the prior art, such intuitive relationships are typically characterized by large ad hoc computer programs that examine spatial data elements in a manner that is difficult or impossible to define precisely other than to examine the steps of the computer program itself. Of course, a large number of intuitive relationships might be desired. Furthermore, the spatial comparison of elements in the data base with each of the twenty-seven possible situations is a very complex process that takes a great deal of computing time.

Pullar and Egenhofer in "Toward Formal Definitions of Topological Relations Among Spatial Objects", presented at the Third International Symposium on Spatial Data Handling at Sydney, Australia, August, 17–19, 1988, published by the Surveying Engineering Program, University of Maine, attempts to establish basic definitions of topological relations among spatial objects. This paper sets forth a proposition that six relationships are all that are necessary to define topological relations. This paper merely seeks to define topological relationships without suggesting any techniques for assessing the relationships among spatial objects.

SUMMARY OF THE INVENTION

The present inventors have determined that the six relationships identified by Pullar et al. are not sufficient to describe all possible relationships among spatial objects. As will be developed below, the preferred embodiment employs 63,880 basic relationships useful in analyzing spatial relationships.

Furthermore, the present invention is an improved method and apparatus for determining whether a specific spatial relationship exists among physical spatial entities by first defining the physical relationship that does exist between the spatial entities by a unique mathematical relationship and then determining whether that mathematical relationship is within the specific spatial relationship. Thus, the approach of the present inventors can be considered as being opposite to the approach taken by the Spatial Analyst TM system described above. Whereas the Spacial Analyst TM system sequentially compares the relationship of the two elements being analyzed with each of twenty-seven possible relationships at a spatial level, the present invention first defines the relationship of spatial entities in terms of a unique mathematical relationship. Then, according to the present invention, a determination is made as to whether the mathematical relationship is within the specific spatial relationship being determined among the physical spatial entities.

According to the method and apparatus of the present invention, whether or not a specific spatial relationship exists among physical spatial entities is determined by determining for each spatial entity, sets of elements forming a representation of each of a number of spatially significant descriptors which describe each of the physical spatial entities. For example, the boundary, interior and closure for each spatial entity can be selected. In this application, the interior of a spatial entity does not include the boundary of the spatial entity, whereas the closure of the spatial entity includes both its boundary and interior. For example, the sets include all of the elements forming the boundary, interior or closure of the spatial entities.

Intersections between the sets of elements of every combination of descriptors between different ones of the spatial entities can be determined. For example, the intersection between the elements of the boundary of a first spatial entity and the boundary of a second spatial entity can be determined; the intersection between the elements of the interior of the first spatial entity and the interior of the second spatial entity can be determined; the intersection of the elements of the boundary of the first spatial entity and the interior of the second spatial entity can be determined; and the intersection of the elements of the interior of the first spatial entity and the boundary of the second spatial entity can be determined. Furthermore, data can be generated concerning the number of elements in each set specifying the boundary and interior of the first and second spatial entities.

After the intersections are determined, relations between every combination of descriptors can be categorized based upon the intersections of the corresponding sets of elements and the descriptors themselves. For example, of the four intersections described above, categorization may occur with respect to set intersection, symmetric difference, set difference and the largest dimension in the intersection sets defined above. In this application, "set intersection" of two sets refers to all elements that are in both sets. The elements that make up the symmetric difference of two sets are those elements which are either in one set or in the other set but not in both sets. The term "set difference" refers to whether the elements of one of the sets form a subset of the other set.

Once the relationships are categorized, the categorizations can be combined to determine a unique mathematical relationship that exists between the spatial entities. Thus, a unique one of a plurality of codes which uniquely identifies the relationship between the spatial entities can be generated.

Any number of these unique mathematical relationships can be combined which together define a specific intuitive relationship. Once the intuitive relationship has been defined in terms of desired mathematical relationships, the unique mathematical relationship between the spatial entities can be compared with the desired mathematical relationships used to define the intuitive relationship. If the unique mathematical relationship is among the desired mathematical relationships then the spatial entities have the intuitive relationship to be determined.

In this manner, whether or not a particular intuitive relationship exists among spatial entities can be determined very rapidly with a minimum of necessary programming. By defining the relationship that exists among the spatial entities in terms of a unique mathematical relationship before it is determined whether that mathematical relationship is included in the intuitive relationship to be determined, processing can occur extremely rapidly.

The present invention lends improved definition and certainty to computer systems performing analysis of spatial data by making specific comparisons and analyses that are relatively simple and well defined, then building up collections of these comparisons and analyses in ways that are easily described in a notation having its basis in set operations. In this way users of such computer systems can easily describe and identify the exact relationships and comparisons that are intended to be made, so that analysis of the desired spatial relationships are performed with the proper mathematical precision. In this manner the present invention is a helpful interface tool for extracting precisely the desired spatial information concerning spatial relationships from a spatial data base.

BRIEF DESCRIPTION OF THE DRAWINGS

These and other objects and advantages of this invention will become more apparent and more readily appreciated from the following detailed description of the presently preferred exemplary embodiment, taken in conjunction with the accompanying drawings, of which:

FIG. 5 shows another example of the categorization of relationships between descriptors based upon FIG. 3; and FIG. 6 illustrates one type of possible categories identifying all possible relationships between intersections of sets of elements containing the boundaries and interiors of two spatial entities.

DETAILED DESCRIPTION OF THE PRESENTLY PREFERRED EXEMPLARY EMBODIMENT

Figure 1:
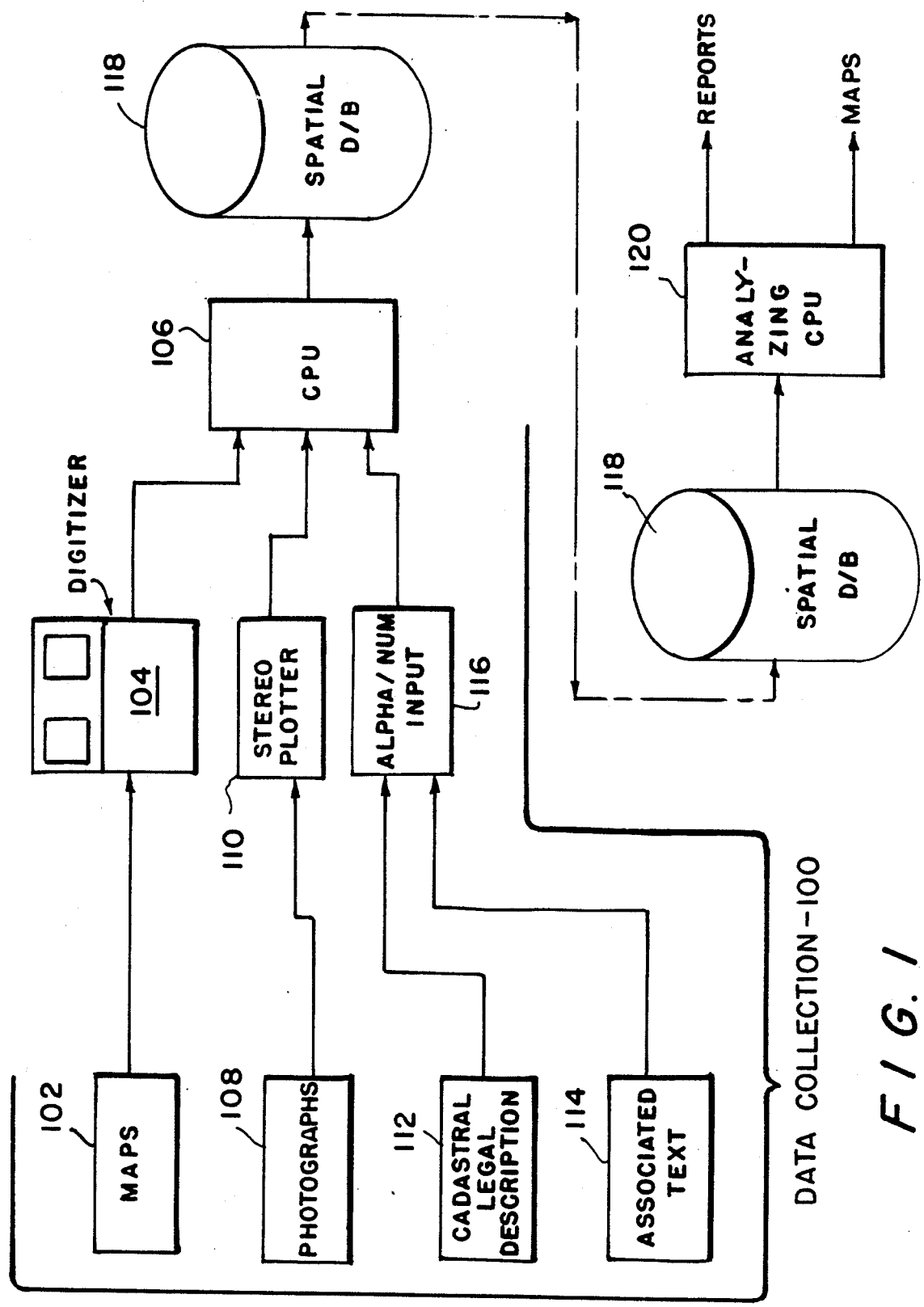
FIG. 1 is a block diagram of a geographic information system.

FIG. 1 illustrates a typical geographic information system. A first portion 100 of the system is provided to enable collection of data related to physical spatial entities. Data from maps 102 are digitized by digitizer 104 and the resulting digitized data is applied to computer 106. Photographs 108 are digitized through stereo-plotter 110, with the data being applied to CPU 106. Cadastral legal descriptions of property 112 and associated text 114 are applied to alphanumeric input device 116 which, in turn, supplies data to computer 106. Computer 106 is programmed to break down the information it receives from the various input sources to produce linked attribute and spatial information regarding the physical spatial entities data has been collected about. This information is stored in spatial data base 118. Thus, the physical spatial entities are analyzed and data concerning the physical spatial entities are stored in spatial data base 118. Data collection portion 100 of the geographic information system is not a part of this invention and, in fact, is quite well known. Therefore, more detailed description is unnecessary.

This invention does relate to the analysis of data stored in spatial data base 118. Specifically, the data is analyzed in analyzing means such as computer 120. One type of analysis, to which the present invention is directed, is the determination of intuitively defined spatial relationships among physical spatial entities. As an example, one such relationship is "contained in" which is used to determine whether a first spatial entity is completely enclosed by a second such entity. This simple intuitive relationship is complex when its determination is implemented in computer 120 since the two entities may overlap in total or in part, or not at all; their boundaries may touch at one point, two points or many points; they may have contiguous boundary lines or surface areas or other common spatial elements. Such determinations are performed by computer 120, along with other well known determinations, so that reports and maps may be generated. Such reports and maps may be employed, for example, for planning purposes, environmental impact analyses, land use analyses and land management.

Figure 2:
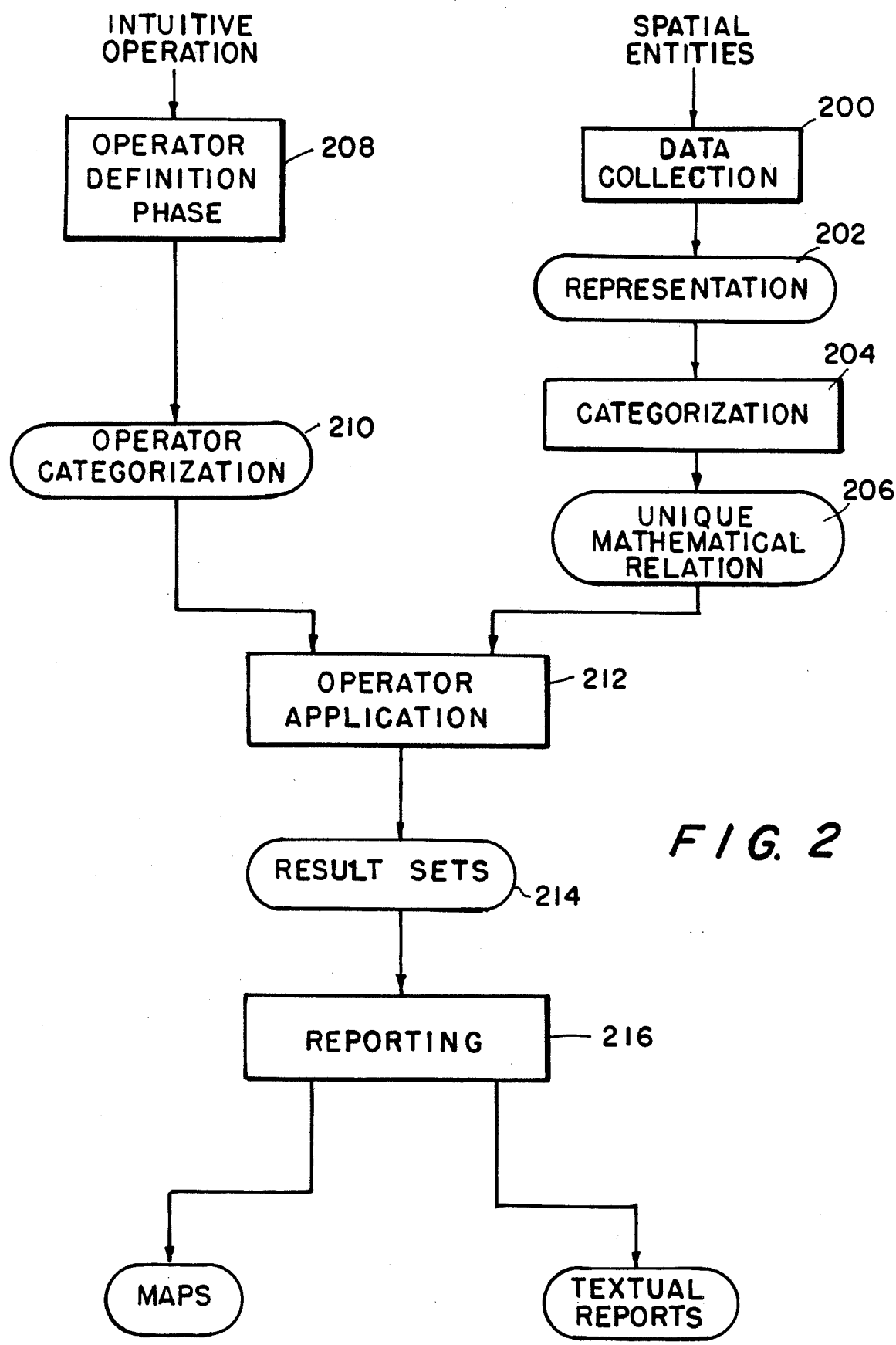
FIG. 2 is a flow chart describing the methodology of the present invention.
Figures 3, 4:
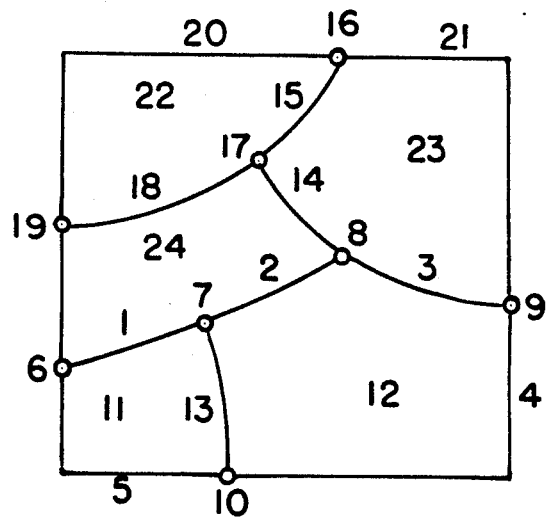
FIG. 3 is an example of information stored in a geographic information system.
FIG. 4 shows the categorization of relationships between descriptors in an example related to FIG. 3.

FIG. 2 is a flow diagram of the process for determining the intuitively defined spatial relationship among physical spatial entities according to the present invention. The first step in the process is to collect data concerning the spatial entities to be analyzed. Thus, step 200 in FIG. 2 is performed by data collection elements 100 in FIG. 1. The result is a representation, indicated a/t step 202, of the spatial entities which is stored in spatial data base 118 (see FIG. 1), as linked attribute and spatial information. Within the data base, spatial entities are generally represented as point descriptors, vector line descriptors and other related entities, all well known in the prior art. An example of a group of spatial entities is illustrated in FIG. 3. An example of representations that might be stored in spatial data base 118 include Road1 consisting of edges 1 and 2, Forest1 consisting of faces 11 and 12, and Road2 consisting of edge 13.

Part of the representation process is to select a plurality of spatially significant descriptors which describe each of the physical spatial entities such as Road1, Forest1, and Road2. In the preferred embodiment, the descriptors employed include the boundary of a spatial entity, the interior of the spatial entity, and the closure of the spatial entity. The closure of a spatial entity consists of all the topology that is in that spatial entity or is metrically close to the spatial entity. The boundary of a spatial entity corresponds closely to the concept of "terminates at in the field of topology". The interior of the spatial entity is that part of the closure which is not the boundary. Thus, the boundary of the spatial entity and the interior of the spatial entity, together make up the closure of the spatial entity. With this definitional scheme, the boundary of an area consists of the edges and nodes surrounding the area. The interior of an area is represented by the faces, edges and nodes lying within the area, but not on its boundary. The closure of an area includes the faces, edges and nodes lying within the area, and the edges and nodes surrounding the area. The boundary of a line consists of its two end nodes. The interior of a line includes the edge connecting the end nodes, but not the end nodes themselves. The boundary of a node does not exist. The interior of the node is the node itself.

In the example illustrated in FIG. 3, the set of elements forming the boundary of Road1 include nodes 6 and 8. The set of elements forming the interior of Road1 includes edges 1 and 2 and node 7. The closure of Road1 includes edges 1 and 2, and nodes 6, 7 and 8. The boundary of Forest1 includes edges 1, 2, 3, 4, and 5 and nodes 6, 7, 8, 9, and 10. The interior of Forest1 includes edge 13 and faces 11 and 12. The closure of Forest1 includes edges 1, 2, 3, 4, 5, and 13, nodes 6, 7, 8, 9, and 10, and faces 11 and 12. The boundary of Road2 includes nodes 7 and 10. The interior of Road2 includes edge 13. The closure of Road2 includes edge 13 and nodes 7 and 10.

Once the sets of elements forming a representation of the boundary, interior, and closure for the spatial entities have been determined, it is then necessary to categorize the relationships between the spatial entities to be analyzed as indicated at step 204. Some portions of the following description use the terminology and notations of set operations. The implementations of these operations in computer programmed systems is well understood to those skilled in the programming art. For example, the operation of taking the intersection of two sets can be implemented in certain computer systems as a process of looking up in a table of stored data elements those elements stored in a second table in order to determine which data elements the two tables store in common. Implementation details will vary among computer systems depending, for example, on the details of the element storage technique that is employed, however these matters are well within the ordinary skill of programming practitioners who deal with spatial data bases. The first portion of this categorizing process is to determine the intersections between the sets of elements of every combination of descriptors between different ones of the spatial entities. Thus, in the preferred embodiment, intersections are determined between the boundary of one spatial entity with the boundary, interior, and/or closure of a second spatial entity, the interior of the first spatial entity with the boundary, interior, and/or closure of the second spatial entity, and, possibly, the closure of the first spatial entity, with the boundary, interior, and/or closure of the second spatial entity.

FIGS. 4 and 5 represent the intersection determinations with the example of FIG. 3. In FIG. 4, the set "A" represents Forest1 and the set "B" represents Road1. In the column headings, the letter "d" represents the boundary, whereas the letter "i" represents interior. Thus dA represents in short hand notation for the set containing all those data base elements that are included in the boundary of Forest1, e.g., edges 1, 2, 3, 4, 5 and nodes 6, 7, 8, 9 and 10. Closure is not illustrated. As illustrated in FIG. 4, the set representing the intersection of the boundary of Forest1 with the boundary of Road1 includes elements 6 and 8. The set representing the intersection of the interior of Forest1 with the interior of Road1 is empty. The set representing the intersection of the boundary of Forest1 with the interior of Road1 includes elements 1, 2, and 7. The set representing the intersection of the interior of Forest1 with the boundary of Road1 is empty.

It is also desirable to collect data concerning the number of elements in each set specifying the boundary and interior of the spatial entities being analyzed. Thus, as illustrated in FIG. 4, the set of elements forming the boundary of Forest1 has ten members. The set of elements forming the interior of Road1 has two members. The set of elements forming the interior of Forest1 has three members. The set of elements forming the interior of Road1 has three members.

FIG. 5 shows a similar set intersection analysis for different sets. In FIG. 5, set "A" represents the elements of Forest1. Set "B" represents the elements of Road2.

Once the intersections of the sets are determined, the next portion of step 204 is to categorize relationships between every combination of descriptors, based upon the intersections of the corresponding sets of elements and the descriptors themselves. Thus, once the intersections of the various sets of boundaries and interiors for the spatial entities has been determined, the relationships defined by these intersections can be categorized. The present inventors have determined that three possible set comparison schemes are based upon set intersections, symmetric difference and set difference. The set intersection of two sets consists of all elements that are in both sets. The symmetric difference of two sets includes those elements that are in either one set of the other set, but not in both sets. The set difference of two sets has to do with whether the sets are subsets of each other. Thus, the set difference between a first and second set consists of those elements in the first set that are not in the second set. If the set difference between the first set and the second set is not empty, while the set difference between the second set and the first set is empty, then the first set is a subset of the second set.

The category "set intersection" is referred to in this application as the "c" category. The term "category" as used in the present embodiment can be implemented as a program variable quantity which occupies a table entry location in program or data base memory, and which can take on any one of a number of values such as zero or one or other values in particular circumstances. This category can have two different values. If the two sets are disjoint (the intersection is empty), then a zero value is assigned to this category. If the two sets are not disjoint (the intersection is not empty), then a value of "1" is assigned to this category.

The "not disjoint" designation of the set intersection category can be further broken down employing symmetric difference. This application refers to the category employing both set intersection and symmetric difference as category "b". If two sets are disjoint, then a value of "0" is assigned to this category. If the two sets are equal (the symmetric difference is empty), a value of "1" is assigned to this category. If the two sets are not disjoint, and not equal (the symmetric difference is not empty), then a value of "2" is assigned to this category.

The "not disjoint, not equal" designation of category "b" can be further broken down, depending on whether either the first or second set is a subset of the other employing set difference. The category employing set intersection and set difference is referred to as category "p" in this application. If the two sets are disjoint, a value of "0" is assigned to this category. If the two sets are equal (both set differences are empty), a value of "1" is assigned to this category. If the first set is a subset of the second set (the set difference between the first set and the second set is not 0, while the set difference between the second set and the first set is 0), a value of "2" is assigned to this category. If the second set is a subset of the first set (the set difference between the first and second set is 0, while the set difference between the second and first set is not 0), a value of "3" is assigned to this category. Finally, if none of the above are true (both set differences are not equal to 0, and the set intersection is not equal to 0), a value of "4" is assigned to this category.

Further classification schemes can be derived using the maximum dimension of the intersection as a variable.

For example, a classification employing both set intersection and the dimension of intersection is referred to as "C" in this application, and can include four different values. If the sets are disjoint, a value of "0" is assigned to this category. If the sets are not disjoint, and the intersection contains at least one face (the dimension of the intersection is 2), a value of "1" is assigned to this category. Values "2" and "3" are assigned to "not disjoint" sets where the intersection contains edges but no faces, and only nodes, respectively.

Seven different values can be assigned to a category employing set intersection, symmetric difference, and dimension. Such a category is referred to as "B" in this application. When the sets are equal, three values are possible, depending on whether the maximum dimension of the intersection is 2, 1, or 0. Similarly, when the sets are not disjoint and not equal, three possible values exist, depending on whether the dimension of the intersection is 2, 1 or 0.

When dimension is added to set intersection and set difference to define a category (referred to as "P" in this application), 13 possible values exist. When the two sets are equal, three values can be assigned, depending on whether the maximum dimension of the intersection is 2, 1 or 0. If the first set is a subset of the second set, again three values are possible depending on the maximum dimension of the intersection. Similarly, when the second set is a subset of the first set, three different values are possible. Finally, when the two sets are not disjoint, not equal, and not subsets of each other, again, three possible values exist, depending upon the maximum dimension of the intersection.

These are not all of the classification schemes that are possible. For example, all of the above classification schemes are based upon intersections of boundary and interior for two spatial entities. Instead, intersections between boundary and closure may be employed for each classification. Thus, classification schemes "c", "b", "p", "C", "B", and "P" can be designated as "c'", "b'", "p'", "C'", "B'" and "P'" when the intersections represented by the classification schemes are those of boundary and closure as compared to boundary and interior.

FIGS. 4 and 5 represent the classification values for the specified intersections employing classifications "c", "b", and "p" as examples. FIG. 4 illustrates the classification values for the various intersections between Forest1 (set "A") and Road1 (set "B") with reference to FIG. 3. The first column of FIG. 4 analyzes the intersection between the boundary of Forest1 and the boundary of Road1. It can be seen that the intersection set is not empty. Therefore, this particular intersection is assigned a value of "1" in classification scheme "c". Furthermore, the sets of elements forming the two boundaries are not the same. Therefore, a value of "2" is assigned to classification scheme "b". Finally, all of the elements of the boundary of Road1 are included in the boundary of Forest1. Therefore, this intersection is given a value of "3" in classification "p".

The set of elements forming the interior of Forest1 is disjoint from the set of elements forming the interior of Road1. Also, the set of elements forming the interior of Forest1 is disjoint from the set of elements forming the boundary of Road1. Therefore, all values for all classifications in the second and fourth columns are "0".

The boundary of Forest1 does intersect the interior of Road1. Therefore, a value of "1" is assigned to this intersection in classification scheme "c". Although the sets do intersect, they are not equal. Therefore, a value of "2" is assigned to this intersection in classification scheme "b". Finally, the set of elements forming the interior of Road1 is a subset of the set of elements forming the boundary of Forest1. Therefore, this intersection is assigned a value of "3" in classification scheme "p".

A similar approach is taken in FIG. 5 with respect to intersections relating to Forest1 (as set "A"), and Road2 (as set "B").

An important advantage of the present invention is that all of the classification values to be assigned can easily be generated based only upon the actual intersection set, along with the number of elements in each of the boundary and interior sets. Thus, for categorization scheme "c", assigning a value of "0" or "1" can be based on whether or not an intersection set exists. For categorization scheme "b", assuming that an intersection set exists, if the number of elements in the intersection set is the same as the number of elements in the two sets being compared, then the two sets are equal, receiving a value of "1". Otherwise, the value to be assigned should be "2".

With respect to classification scheme "p", if the number of elements in one set is equal to the number of elements in the intersection set, and if the number of elements in the other set is different from that number, then the one set is a proper subset of the other set.

Even the elements of the sets relating to closure (the primed classification schemes) can be generated from the intersections of sets involving a boundary and interior of the spatial entities being compared. Thus, the set of elements forming the intersection of the closure of spatial entity "A" and the closure of spatial entity "B" consists of those elements which are in the union of the sets of elements of the intersection of the boundaries of "A" and "B", the intersection of the interiors of "A" and "B", the intersection of the boundary of "A" and the interior of "B", and the intersection of the interior of "A" and the boundary of "B". The set of elements formed by the intersection of the closure of spatial entity "A" and the boundary of spatial entity "B" consists of the elements in the union the intersection of the boundaries of "A" and "B" and the intersection of the interior of "A" with the boundary of "B". Thus, the actual intersection sets involving closures of spatial entities can be derived from the intersection sets related to a boundary and interior of the spatial entities.

As indicated at step 206 in FIG. 2, the next step in the process of determining the relationship between spatial entities is to determine a unique mathematical relationship that exists between the spatial entities by combining the categorized relationship. In the preferred embodiment, determining the unique mathematical relationship takes the form of generating a unique one of a plurality of codes based upon the categorizations which have been performed, which uniquely identifies the relationship. This can be accomplished by combining the categorized relationships to determine a unique mathematical relationship that exists between the spatial entities.

Consider, for example, FIG. 6. For classification scheme c, 16 possible value combinations exist for the four intersections of boundary and interior listed in FIGS. 4 and 5. Those 16 possible combinations of values are listed in FIG. 6. Not only must every possible relationship existing between spatial entities A and B be defined by one of the 16 possibilities, but also, any particular relationship between spatial entities A and B is defined by only one of the 16 possibilities. Thus, codes c0 through c15 may be defined for the 16 possible value combinations for characterization scheme c. Note that the numeric designation for each combination corresponds to the number represented by the binary representation of values.

In a similar manner, unique codes can be generated for each classification. Classification b has 81 codes ($3^4$), classification p has 625 codes ($5^4$), classification C has 256 codes ($4^4$), classification B has 2401 codes ($7^4$) and classification P has 28,561 codes ($13^4$).

The result of step 206 in FIG. 2 is a unique mathematical relationship or code which describes the relationship between the spatial entities being analyzed. It is then necessary to determine whether the particular unique mathematical relationship identified in step 206 falls within the intuitively defined spatial relationship being analyzed.

Thus, at step 208, an operator definition phase is performed in which an operator selects the particular intuitive relationship to be analyzed. This is followed by an operator categorization phase 210 in which an operator selects desired mathematical relationships or codes which together define the particular intuitive relationship.

For example, suppose an operator intuitively determines that an overlap relationship exists between first and second spatial entities whenever the set consisting of the intersection of the elements of the interiors of the two spatial entities is not empty. Once an intuitive relationship is defined in this manner, it can be expanded as some combination of the above-described classifications. For example, either c2, c3, c6, c7, c10, c11, c14 or c15, as defined above, would result in the intersection of the interiors of the two sets to be not empty. It is readily apparent from FIG. 6 that the c classifications involved in overlap are simply those in which the second column is one.

An alternative notation is as follows:

$$an = [a; w; x; y; z;],$$

where a is the classification scheme being employed and $n = w + 2*x + 4*y + 8*z$. With such a notation, $$overlap = [c; ;1; ; ;].$$

In this notation, a blank represents the universe (all possible values). In this form, overlap is easier to calculate than the expansions illustrated in FIG. 6, since only the intersection of the interiors needs to be evaluated.

Obviously, the same sort of notation can be employed with any of the classification schemes described above.

Once the intuitive relationship is classified at step 210 in FIG. 2, it is then necessary to apply the unique mathematical relationship between the spatial entities determined at step 206 to the classifications corresponding to the intuitive relationship as determined at step 210. This application occurs at step 212.

Thus the overlap relationship can be applied to the examples set forth in FIGS. 4 and 5 of this application. In FIG. 4, the relationship between Forest1 and Road1 is analyzed, producing a relationship in the c classification of [c;1;0;1;0;]. When this classification is intersected with the overlap relationship, it can be seen that the 1 in the overlap relationship corresponds with a 0 in the classification between Forest1 and Road1. Therefore, Forest1 and Road1 do not overlap. Indeed, from FIG. 3, it can be seen that Road1 lies along an edge of Forest1.

The relationship of Forest1 to Road2, illustrated in FIG. 5, can be expressed as [c;1;1;0;0;]. The intersection of the overlap relationship with this classification of Forest1 and Road2 produces a true result, indicating that Road2 and Forest1 do overlap.

In performing steps 208 and 210 in FIG. 2, the first step obviously is to begin with the intuitive relationship to be analyzed. For example, suppose that "A properly contains B" means that set B is contained completely in the interior of set A. A first attempt to formalize this may be:

properly contains (A,B) = if CLS (B) subset of i(A)
TRUE
else
FALSE, where CLS indicates closure and i indicates interior. After checking several cases, it can be determined that this appears to be a reasonable definition. Then, turning to the operator classification step 210, it is necessary to determine which level of classification is required. Since closure and containment is required, the obvious choice is classification scheme p'. Translating i(A) as CLS(A)−d(A) (where d represents boundary) we have:

properly contains (A,B) = if CLS(B) is a subset of
CLS(A) - d(A)
TRUE
else
FALSE The closure of B is a subset of the closure of A less the boundary of A if and only if the closure of B is a subset of the closure of A and the intersection between the closure of B and the boundary of A is empty.

Therefore, a direct translation of notation provides:
properly contains = [p'; ;3;0; ;] Since the boundary of B is a subset of the closure of B, some of the p' classifications are identically false. For this reason, the following is an equivalent definition:

properly contains = [p'; ;3;0;3;]

Once the unique mathematical relation determined at step 206 is compared with the categories corresponding to the intuitively defined relationship at step 212, result sets are produced at step 214 in FIG. 2. The product of these result sets can then be employed to generate reports as indicated at step 216, such as maps and textual reports.

In this manner, the relationship between physical spatial entities can be determined through a rigorous method. According to the present invention, even intuitively defined spatial relationships can be analyzed by redefining the intuitively defined spatial relationship in terms of more mathematically rigorous classifications. By including such a redefining process, any intuitively defined spatial relationship can be accurately analyzed.

Furthermore, by first defining the relationship between existing physical spatial entities in terms of a unique mathematical relationship or code, and then comparing the mathematical relationship itself to the classifications corresponding to the intuitively defined spatial relationship, analyzing spatial relationships can occur with a minimum of processing in a very short period of time.

Although only a single preferred embodiment of this invention has been described in detail above, those skilled in the art will readily appreciate that many modifications are possible in the preferred embodiment without materially departing from the novel teachings and advantages of this invention. Accordingly, all such modifications are intended to be included within this invention as defined by the following claims.

What is claimed is:

1. A method for determining whether a specified spatial relationship exists among physical spatial entities comprising the steps of:
   (a) determining sets of elements forming a representation of each of a plurality of spatially significant descriptors which describe each of said physical spatial entities;
   (b) determining with processing means intersections between the sets of elements of every combination of descriptors between different ones of said spatial entities;
   (c) categorizing with said processing means relationships between every combination of descriptors based upon the intersections of the corresponding sets of elements and the descriptors themselves;
   (d) combining with said processing means said relationships categorized in said step (c) to determine a unique mathematical relationship that exists between said spatial entities; and
   (e) determining with said processing means whether said unique mathematical relationship between said spatial entities matches any one of a plurality of desired mathematical relationships which collectively define said specified spatial relationship, to determine that said spatial entities have said specified spatial relationship.

2. A method as in claim 1, wherein said determining step (a) includes the step of determining sets forming representations of a plurality of spatially significant descriptors including at least two of boundary, interior and closure.

3. A method as in claim 2, wherein said determining step (a) includes the step of determining sets representing boundary and at least one of interior and closure.

4. A method as in claim 1, wherein said intersection determining step (b) includes the step of determining with said processing means intersections between the sets of elements of: (1) a boundary of one of said spatial entities and a boundary of another of said spatial entities, (2) an interior of said one spatial entity and an interior of said another spatial entity, (3) said boundary of said one spatial entity and said interior of said another spatial entity and (4) said interior of said one spatial entity and said boundary of said another spatial entity.

5. A method as in claim 4, wherein said interior of said one spatial entity includes the boundary of said one spatial entity and said interior of said another spatial entity includes said boundary of said another spatial entity.

6. A method as in claim 1, wherein said categorizing step (c) includes the step of categorizing with said processing means said relationships based upon set intersection.

7. A method as in claim 1, wherein said categorizing step (c) includes the step of categorizing with said processing means said relationships based upon set intersection and symmetric difference.

8. A method as in claim 1, wherein said categorizing step (c) includes the step of categorizing with said processing means said relationships based upon set intersection and set difference.

9. A method as in claim 6, wherein said categorizing step (c) also includes categorizing with said processing means said relationships based upon a largest dimension of set intersection.

10. A method as in claim 7, wherein said categorizing step (c) also categorizes with said processing means said relationships based upon a largest dimension of said set intersection and largest dimension of said symmetric difference.

11. A method as in claim 8, wherein said categorizing step (c) categorizes with said processing means said relationships also based upon a largest dimension of said set intersection and a largest dimension of said set difference.

12. A method as in claim 6, wherein said categorizing step (c) categorizes with said processing means said relationships also based upon the number of elements in each set determined in said determining step (a).

13. A method as in claim 7, wherein said categorizing step (c) categorizes with said processing means said relationships also based upon the number of elements in each set determined in said determining step (a).

14. A method as in claim 8, wherein said categorizing step (c) categorizes with said processing means said relationships also based upon the number of elements in each set determined in said determining step (a).

15. A method as in claim 1, wherein said combining step (d) includes the step of generating with said processing means a unique one of a plurality of codes, based upon said categorizing step (c), which uniquely identifies said relationship.

16. A method as in claim 15, wherein said determining step (e) includes the step of determining with said processing means said unique code matches any one of a plurality of desired codes used to define said specified spatial relationship, to determine that said spatial entities have said specified spatial relationship.

17. A method as in claim 1 further comprising the step of selecting said desired mathematical relationships which together define said specified spatial relationship.

18. A method for determining whether a specific spatial relationship exists between first and second physical spatial entities comprising the steps of:
    (a) determining, with processing mans, sets of elements forming a representation of a boundary for each of said first and second spatial entities;
    (b) determining with processing means sets of elements forming a representation of an interior for each of said first and second spatial entities;
    (c) determining with said processing means intersections between the sets of elements of: (1) said boundary of said first spatial entity and said boundary of said second spatial entity, (2) said interior of said first spatial entity and said interior of said second spatial entity; (3) said boundary of said first spatial entity and said interior of said second spatial entity and (4) said interior of said first spatial entity and said boundary of said second spatial entity;
    (d) determining with said processing means the number of elements in each set specifying the boundary and interior of said first and second spatial entities;
    (e) categorizing with said processing means relationships between each of boundary and interior of said first spatial entity and both of boundary and interior of said second spatial entity, respectively, based upon at least one of set intersection, symmetric difference, set differences and dimension, said categorizing being based on said determining step (c) and said generating step (d);
    (f) generating with said processing means a unique one of a plurality of codes, based upon said categorizing step (e), which uniquely identifies said relationships; and
    (g) determining with said processing means whether said unique code matches any one of a plurality of desired codes which collectively define said specified spatial relationship, to determine that said spatial entities have said specified spatial relationship.

19. A method as in claim 18, wherein said determining step (b), when determining elements forming a representation of said interior, also includes elements forming a representation of said boundary for each of said first and second spatial entities.

20. A method as in claim 18, wherein said categorizing step (e) categorizes with said processing means relationships based upon said set intersection and said symmetric difference.

21. A method as in claim 18, wherein said categorizing step (e) categorizes with said processing means said relationships based upon said set intersection and said set difference.

22. A method as in claim 18, wherein said categorizing step (e) categorizes with said processing means said relationships based upon at least set intersection and the largest dimension of intersection.

23. A method as in claim 20, wherein said categorizing step (e) categorizes with said processing means relationships also based upon a largest dimension of said intersection and a largest dimension of symmetric difference.

24. A method as in claim 21, wherein said categorizing step (e) categorizes with said processing means relationships also based upon a largest dimension of set intersection and a largest dimension of set difference.

25. A method as in claim 18, further comprising the step of selecting said desired codes which together define said specified spatial relationship.

26. Apparatus for determining whether a specified spatial relationship exists among physical spatial entities comprising:
    means for storing representations of said spatial entities;

means, coupled to said storing means, for entering said representations of said spatial entities into said storing means; and analyzing means, coupled to said storing means, for: (1) determining sets of elements forming a representation of each of a plurality of spatially significant descriptors which describe each of said physical spatial entities; (2) determining intersections between the sets of elements of every combination of descriptors between different ones of said spatial entities; (3) categorizing relationships between every combination of descriptors based upon the intersections of the corresponding sets of elements and the descriptors themselves; (4) combining said categorized relationships to determine a unique mathematical relationship that exists between said spatial entities; and (5) determining whether said unique mathematical relationship between said spatial entities matches any one of a plurality of desired mathematical relationships which collectively define said specified spatial relationship, to determine that said spatial entities have said specified spatial relationship.

27. Apparatus as in claim 26, wherein said analyzing means, when performing said set determining function determines sets forming representations of a plurality of spatially significant descriptors including at least two of boundary, interior and closure.

28. Apparatus as in claim 27, wherein said analyzing means, when performing said set determining function, determines sets representing boundary and at least one of interior and closure.

29. Apparatus as in claim 26, wherein said analyzing means, when performing said intersection determining function, determines intersections between the sets of elements of: (1) a boundary of one of said spatial entities and a boundary of another of said spatial entities, (2) an interior of said one spatial entity and an interior of said another spatial entity, (3) said boundary of said one spatial entity and said interior of said another spatial entity and (4) said interior of said one spatial entity and said boundary of said another spatial entity.

30. Apparatus as in claim 29, wherein said interior of said one spatial entity includes the boundary of said one spatial entity and said interior of said another spatial entity includes said boundary of said another spatial entity.

31. Apparatus as in claim 26, wherein said analyzing means, when performing said categorizing function, categorizes said relationships based upon set intersection.

32. Apparatus as in claim 26, wherein said analyzing means, when performing said categorizing function, categorizes said relationships based upon set intersection and symmetric difference.

33. Apparatus as in claim 26, wherein said analyzing means, when performing said categorizing function, categorizes said relationships based upon set intersection and set difference.

34. Apparatus as in claim 31, wherein said analyzing means, when performing said categorizing function, categorizes said relationships based upon a largest dimension of set intersection.

35. Apparatus as in claim 32, wherein said analyzing means, when performing said categorizing function, also categorizes said relationships based upon a largest dimension of said set intersection and largest dimension of said symmetric difference.

36. Apparatus as in claim 33, wherein said analyzing means, when performing said categorizing function, categorizes said relationships also based upon a largest dimension of said set intersection and a largest dimension of said set difference.

37. Apparatus as in claim 31, wherein said analyzing means, when performing said categorizing function, categorizes said relationships also based upon the number of elements in each of said sets.

38. Apparatus as in claim 32, wherein said analyzing means, when performing said categorizing function, categorizes said relationships also based upon the number of elements in each of said sets.

39. Apparatus as in claim 33, wherein said analyzing means, when performing said categorizing function, categorizes said relationships also based upon the number of elements in each of said sets.

40. Apparatus as in claim 26, wherein said analyzing means, when performing said combining function, generates a unique one of a plurality of codes, based upon said categorizing function, which uniquely identifies said relationship.

41. Apparatus as in claim 40, wherein said analyzing means, when performing said relationship determining function, determines whether said unique code matches any one of a plurality of desired codes used to define said specified spatial relationship, to determine that said spatial entities have said specified spatial relationship.

42. Apparatus as in claim 26, wherein said analyzing means also selects said desired mathematical relationships which together define said specified spatial relationship.

43. Apparatus for determining whether a specific spatial relationship exists between first and second physical spatial entities comprising:

means for storing representations of said physical spatial entities;

means, coupled to said storing means, for entering said representations into said storing means; and analyzing means, coupled to said storing means, for: (1) determining sets of elements forming a representation of a boundary for each of said first and second spatial entities; (2) determining sets of elements forming a representation of an interior for each of said first and second spatial entities; (3) determining intersections between the sets of elements of: (a) said boundary of said first spatial entity and said boundary of said second spatial entity, (b) said interior of said first spatial entity and said interior of said second spatial entity, (c) said boundary of said first spatial entity and said interior of said second spatial entity and (d) said interior of said first spatial entity and said boundary of said second spatial entity; (4) determining the number of elements in each set specifying the boundary and interior of said first and second spatial entities; (5) categorizing relationships between each of boundary and interior of said first spatial entity and both of boundary and interior of said second spatial entity, respectively, based upon at least one of set intersection, symmetric difference, set differences and dimension, said categorizing being based on said intersection determining function and said data generating function; (6) generating a unique one of a plurality of codes, based upon said categorization, which uniquely identifies said relationships; and (7) determining whether said unique code matches any one of a plurality of desired codes which collectively define said specified spatial relationship, to determine that said spatial entities have said specified spatial relationship.

44. Apparatus as in claim 43, wherein said analyzing means, when determining elements forming a representation of said interior also includes elements forming a representation of said boundary for each of said first and second spatial entities.

45. Apparatus as in claim 43, wherein said analyzing means, when performing said categorizing function, categorizes relationships based upon said set intersection and said symmetric difference.

46. Apparatus as in claim 43, wherein said analyzing means, when performing said categorizing function, categorizes said relationships based upon said set intersection and said set difference.

47. Apparatus as in claim 43, wherein said analyzing means, when performing said categorizing function, categorizes said relationships based upon at least set intersection and the largest dimension of intersection.

48. Apparatus as in claim 45, wherein said analyzing means, when performing said categorizing function, categorizes relationships also based upon a largest dimension of said intersection and a largest dimension of symmetric difference.

49. Apparatus as in claim 46, wherein said analyzing means, when performing said categorizing function, categorizes relationships also based upon a largest dimension of set intersection and a largest dimension of set difference.

50. Apparatus as in claim 43, wherein said analyzing means also selects said desired codes which together define said specified spatial relationship.

* * * * *